(12) United States Patent
Lin

(10) Patent No.: US 7,815,208 B1
(45) Date of Patent: Oct. 19, 2010

(54) STRUCTURE FOR LATERALLY MOVING A FOLDED FOLDING BICYCLE

(76) Inventor: Yi-Cheng Lin, No. 1, 203 Alley, Lushan Ln., Nanyang Rd., Fengyuan City, Taichung County 420 (TW)

( * ) Notice: Subject to any disclaimer, the term of this patent is extended or adjusted under 35 U.S.C. 154(b) by 19 days.

(21) Appl. No.: 12/418,644

(22) Filed: Apr. 6, 2009

(51) Int. Cl.
*B62H 1/12* (2006.01)
(52) U.S. Cl. .................... 280/298; 280/304; 280/293
(58) Field of Classification Search .............. 280/288.4, 280/293, 298, 301, 304, 287, 278
See application file for complete search history.

(56) References Cited

U.S. PATENT DOCUMENTS

| | | | | | |
|---|---|---|---|---|---|
| 453,094 | A | * | 5/1891 | Taylor | 280/304 |
| 578,937 | A | * | 3/1897 | Lincoln | 280/304 |
| 617,916 | A | * | 1/1899 | Williams | 280/304 |
| 1,233,300 | A | * | 7/1917 | Bancalari | 280/304 |
| 2,535,283 | A | * | 12/1950 | Groom | 280/293 |
| 2,828,141 | A | * | 3/1958 | Erstad et al. | 280/304 |
| 4,367,883 | A | * | 1/1983 | Anderson | 280/301 |
| 4,580,804 | A | * | 4/1986 | Weber | 280/300 |
| 5,419,575 | A | * | 5/1995 | Shepherd | 280/302 |
| 6,494,423 | B1 | * | 12/2002 | Ruth | 248/188.8 |
| 2008/0296865 | A1 | * | 12/2008 | Canetti | 280/301 |

* cited by examiner

*Primary Examiner*—Tony H. Winner

(57) ABSTRACT

A structure for laterally moving a folded folding bicycle includes a front assembly for wheeling laterally and a rear assembly for wheeling laterally comprising a sleeve secured to a seat stay and having a substantially J-shaped opening having an upward directed notch at a lower end, a support tube, an auxiliary wheel rotatably secured to the support tube, and a threaded lever. The support tube is inserted through the sleeve and the elastic member and the lever is driven through an upper end of the opening into the support tube to slidably secure the support tube to the sleeve with an elastic member biased between the top of the support tube and the sleeve. After folding the bicycle the lever slidably pushes downward until entering the notch to be locked therein so as to change orientation of the auxiliary wheel to be perpendicular to that of the rear wheel.

6 Claims, 4 Drawing Sheets

STRUCTURE FOR LATERALLY MOVING A FOLDED FOLDING BICYCLE

BACKGROUND OF THE INVENTION

1. Field of Invention

The invention relates to folding bicycles and more particularly to a structure for laterally moving a folded folding bicycle by disposing auxiliary wheels thereof being perpendicular to either bicycle wheel.

2. Description of Related Art

The invention of bicycles is about two hundred years. They are still the main transportation means in many regions throughout the world. Further, bicycles are becoming more popular due to the concern of energy shortage and skyrocketing price of petroleum oil. Bicycle riding has many benefits and advantages, but it also has some inconveniences. For example, fixed frame bicycles are bulky. Also, traveling distance of a bicycle is limited. One may carry a bicycle on a car, a railroad coach, or a rapid transit car for transporting to a far place prior to riding same after unloading. However, it is difficult of storing a bicycle in the trunk of a typical car. For transporting by railroad or rapid transit, there are many restrictions on height, width, and length of a bicycle to be carried. Typically, a folding bicycle can be broken down into a more compact size. That is why folding bicycles are popular among specific groups of people.

It is difficult of smoothly moving a folded folding bicycle in view of the current technology. One prior art directs to a folding bicycle equipped with a rear auxiliary wheel. A rider may wheel the folded folding bicycle to board a raid transit car or unload the same. Further, the rider may wheel the folded folding bicycle to a desired place. However, a drawback has been found in the conventional folding bicycle. In detail, the rear auxiliary wheel is fixed in a direction perpendicular to that of the bicycle wheels. Hence, the rear auxiliary wheel may hinder the normal wheeling of the bicycle wheels or even cause danger when the rear auxiliary wheel contacts the ground. Thus, the need for improvement still exists.

SUMMARY OF THE INVENTION

It is therefore one object of the invention to provide a structure for laterally moving a folded folding bicycle by disposing auxiliary wheels thereof being perpendicular to either bicycle wheel.

For achieving the above and other objects, the invention provides a structure for a folding bicycle including a top tube, a seat stay, a front wheel, a rear wheel, a crank arm, a seat, and a seat tube, the structure comprising a front assembly for wheeling laterally comprising a first auxiliary wheel, the front assembly for wheeling laterally being slidably secured to a lower portion of the seat tube; and a rear assembly for wheeling laterally comprising a sleeve secured to the seat stay, the sleeve comprising a longitudinal substantially J-shaped opening having an upward directed notch at a lower end, a support tube having a stop at the top, a second auxiliary wheel rotatably secured to the bottom of the support tube, an elastic member, and a threaded lever, wherein the support tube is inserted through the sleeve and the elastic member to secure to the stop and the lever is driven through an upper end of the opening into the support tube to slidably secure the support tube to the sleeve with the elastic member being biased between the stop and the sleeve; and wherein in response to folding the folding bicycle the lever is adapted to push downward to slide along the opening until entering the notch to be locked therein so as to further bias the elastic member, change an orientation of the second auxiliary wheel from being parallel to that of the rear wheel to be perpendicular to that of the rear wheel, and cause the second auxiliary wheel to contact the ground. Thereafter, a rider may hold and push a seat to laterally move the folding bicycle to a desired place with ease.

In one aspect of the invention each of the rear assembly for wheeling laterally and the front assembly for wheeling laterally is disposed on a position of the folding bicycle above the ground a sufficient distance when the folding bicycle is in a ready to use position or when the folding bicycle moves forward. This can prevent both the rear and front assemblies for wheeling laterally from hindering the normal wheeling operation of the front and rear wheels. Further, the rear assembly for wheeling laterally may not hinder the normal riding of the folding bicycle even if the auxiliary wheel of the rear assembly for wheeling laterally contacts the ground. This is because the rotating direction of the auxiliary wheel is parallel to that of either wheel.

The above and other objects, features and advantages of the invention will become apparent from the following detailed description taken with the accompanying drawings.

DETAILED DESCRIPTION OF THE INVENTION

Figure 1:
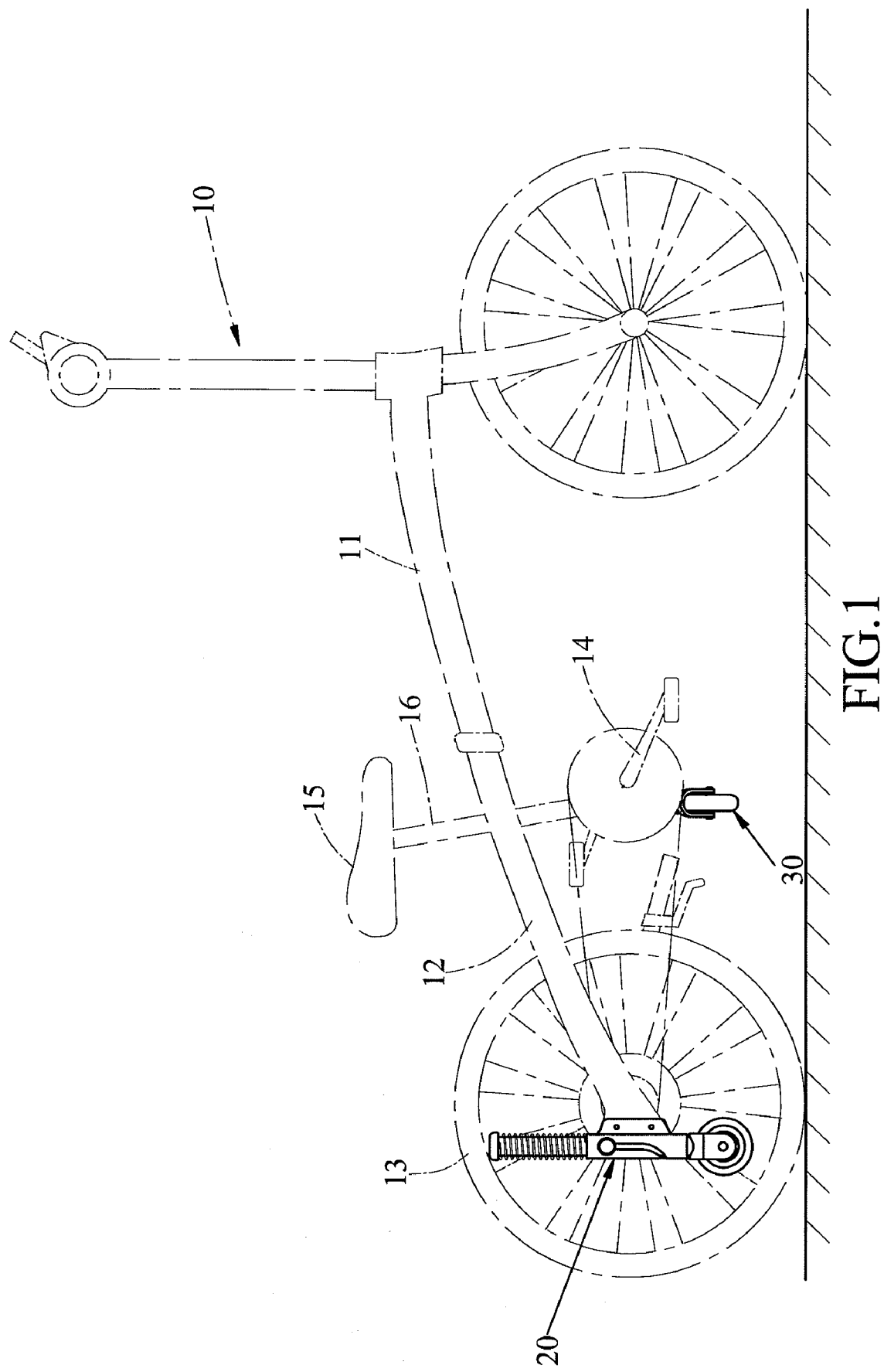
FIG. 1 is a side elevation of a folding bicycle according to the invention where the folding bicycle is in a ready to use state.

Referring to FIGS. 1 to 4, a folding bicycle 10 incorporating a structure for laterally moving thereof in a folded state in accordance with the invention is shown. The folding bicycle 10 comprises a top tube 11, a seat stay 12, front and rear wheels 13, a crank arm 14, a seat 15, and a seat tube 16. The folding bicycle 10 further comprises the following components as discussed in detail below.

A rear assembly for wheeling laterally 20 comprises a sleeve 21, an auxiliary wheel 22, a support tube 23, an elastic member 24, and a lever 25. The sleeve 21 has a side bracket (not numbered) being affixed to the seat stay 12. The auxiliary wheel 22 is rotatably secured to the bottom of the support tube 23. The support tube 23 is inserted through the sleeve 21 and the elastic member 24 to threadedly secure to a stop 231 on the top thereof. The stop 231 is implemented as a nut in this embodiment. Alternatively, the stop 231 may be formed integrally with the support tube 13. Still alternatively, the stop 231 may be secured to the top of the support tube 13 by soldering. As such, the elastic member 24 is elastically biased between the nut 231 and the sleeve 21. A longitudinal substantially J-shaped opening 211 is formed on the surface of the sleeve 21 and is open to both inside and outside of the sleeve 21. The lower end of the opening 211 is directed upward about 90 degrees to form a notch 212.

The lever 25 has a threaded shank (not numbered) driven through the top end of the opening 211 into a threaded hole (not numbered) on the intermediate portion of the support tube 23 to slidably secure the support tube 23 to the sleeve 21. After folding the folding bicycle 10, a rider may push the lever 25 downward with his or her foot to cause it to slide downward along the opening 211 until the shank of the lever 25 enters the notch 212 to lock therein. Also, the orientation of the lever 25 changes from being perpendicular to that of the rear wheel 13 (see FIG. 1) to being parallel to that of the rear wheel 13 (see FIG. 2). Further, the auxiliary wheel 22 is in contact with the ground. That is, the auxiliary wheel 22 is ready to move toward one side of the folding bicycle 10 by wheeling. Note that the elastic member 24 is compressed to store elastic energy therein when the auxiliary wheel 22 is in this position (see solid lines of FIG. 4).

To the contrary, for riding the folding bicycle 10 again the rider may first push down the lever 25 with his or her foot to clear the notch 212. Next, the foot may release the lever 25. As a result, the elastic member 24 releases its stored elastic energy to slide the lever 25 upward along the opening 211 until being stopped at the top end of the opening 211 (see phantom lines of FIG. 4). Also, the orientation of the lever 25 changes from being parallel to that of the rear wheel 13 (see FIG. 2) to being perpendicular to that of the rear wheel 13 (see FIG. 1). Further, the auxiliary wheel 22 is lifted to a position above the ground. That is, the folding bicycle 10 is ready to move forward by wheeling. Note that the elastic member 24 is expanded in this state of the auxiliary wheel 22 (see phantom lines of FIG. 4). It is further noted that the auxiliary wheel 22 will not hinder a normal forward movement of the folding bicycle 10 even if the auxiliary wheel 22 contacts the ground since the auxiliary wheel 22 may rotate in the same direction as the wheels 13.

A front assembly for wheeling laterally 30 comprises a tubular member 31 and an extension 32 at one side of the tubular member 31. An inverted U-shaped wheel mount 33 is extended downward from the extension 32. An auxiliary wheel 34 is rotatably mounted between the lower ends of the wheel mount 33. The tubular member 31 has two opposite extending portions (not numbered) having two threaded holes (not numbered) above the extension 32. A thumbscrew 311 is adapted to drive through the aligned threaded holes to secure the tubular member 31 to a lower portion of the seat tube 16.

Preferably, the elastic member 24 is a compression spring.

As shown in FIG. 1, each of the rear assembly for wheeling laterally 20 and the front assembly for wheeling laterally 30 is disposed on a position of the folding bicycle 10 above the ground a sufficient distance by pulling upward when the folding bicycle 10 is in a ready to use position or when the folding bicycle 10 moves forward. This means that both the rear assembly for wheeling laterally 20 and the front assembly for wheeling laterally 30 may not hinder the normal wheeling operation of the front and rear wheels 13. Further, the rear assembly for wheeling laterally 20 may not hinder the normal riding of the folding bicycle 10 even if the auxiliary wheel 22 of the rear assembly for wheeling laterally 20 contacts the ground. This is because the rotating direction of the auxiliary wheel 22 is parallel to that of either wheel 13.

Figure 2:
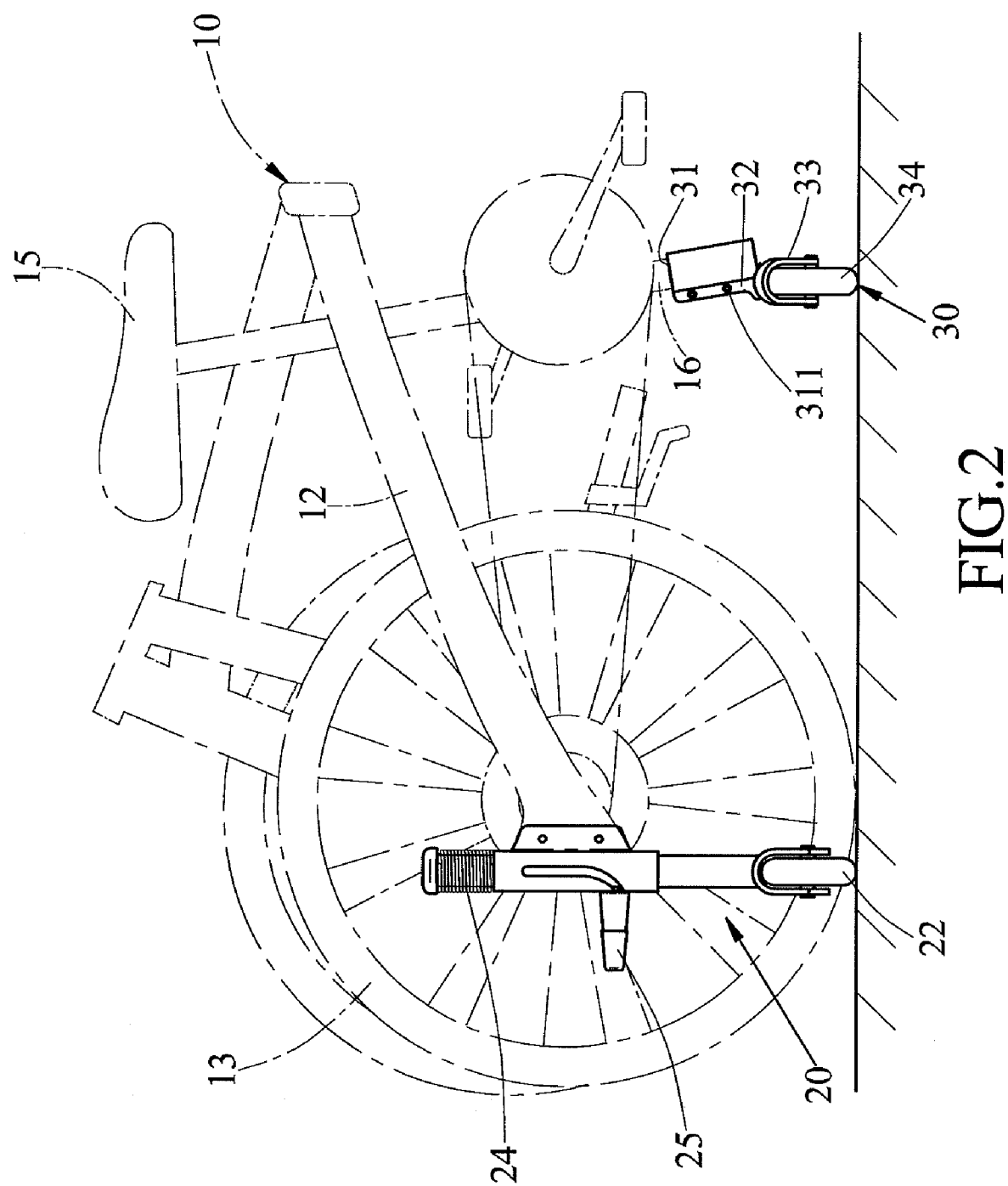
FIG. 2 is a view similar to FIG. 1 where the folding bicycle is folded with both front and rear assemblies for wheeling laterally being pulled down to contact the ground.
Figure 3:
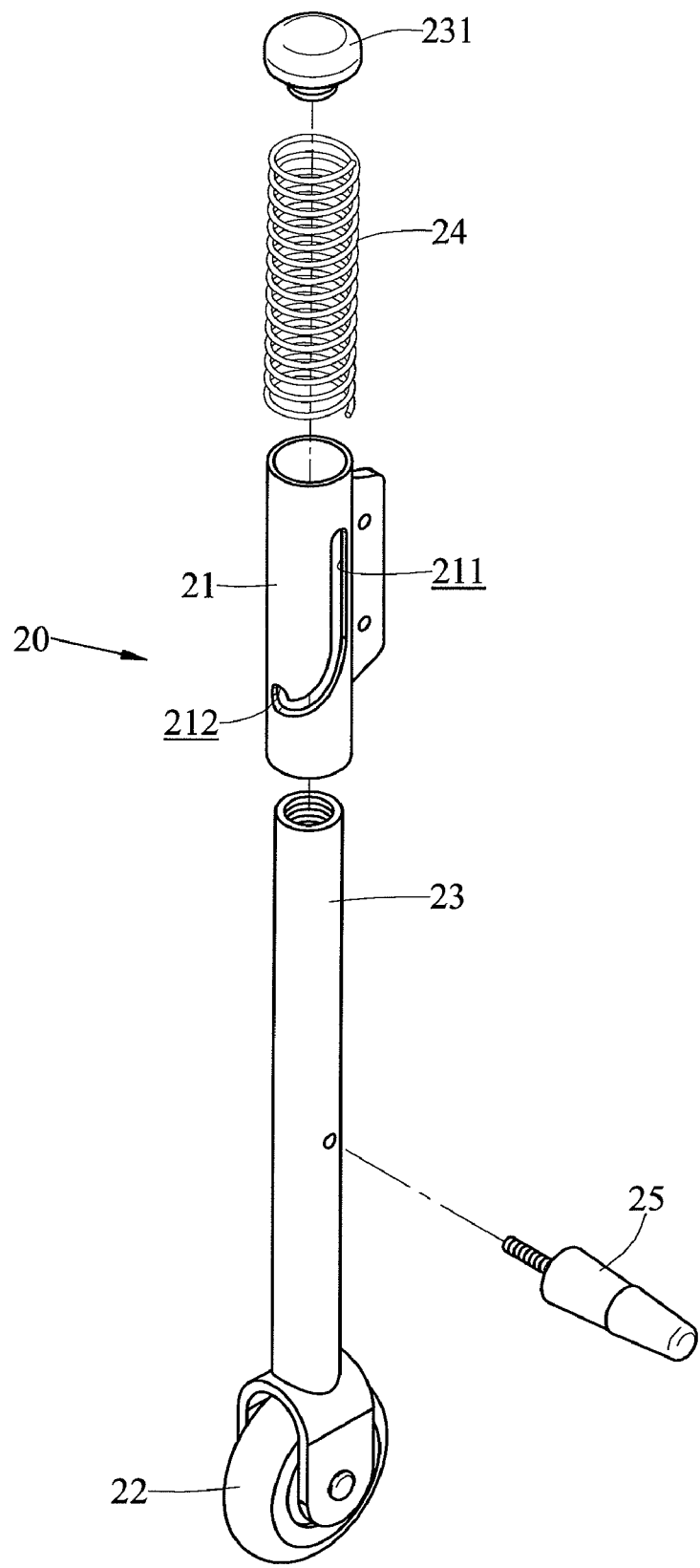
FIG. 3 is an exploded view of the rear assembly for wheeling laterally.
Figure 4:
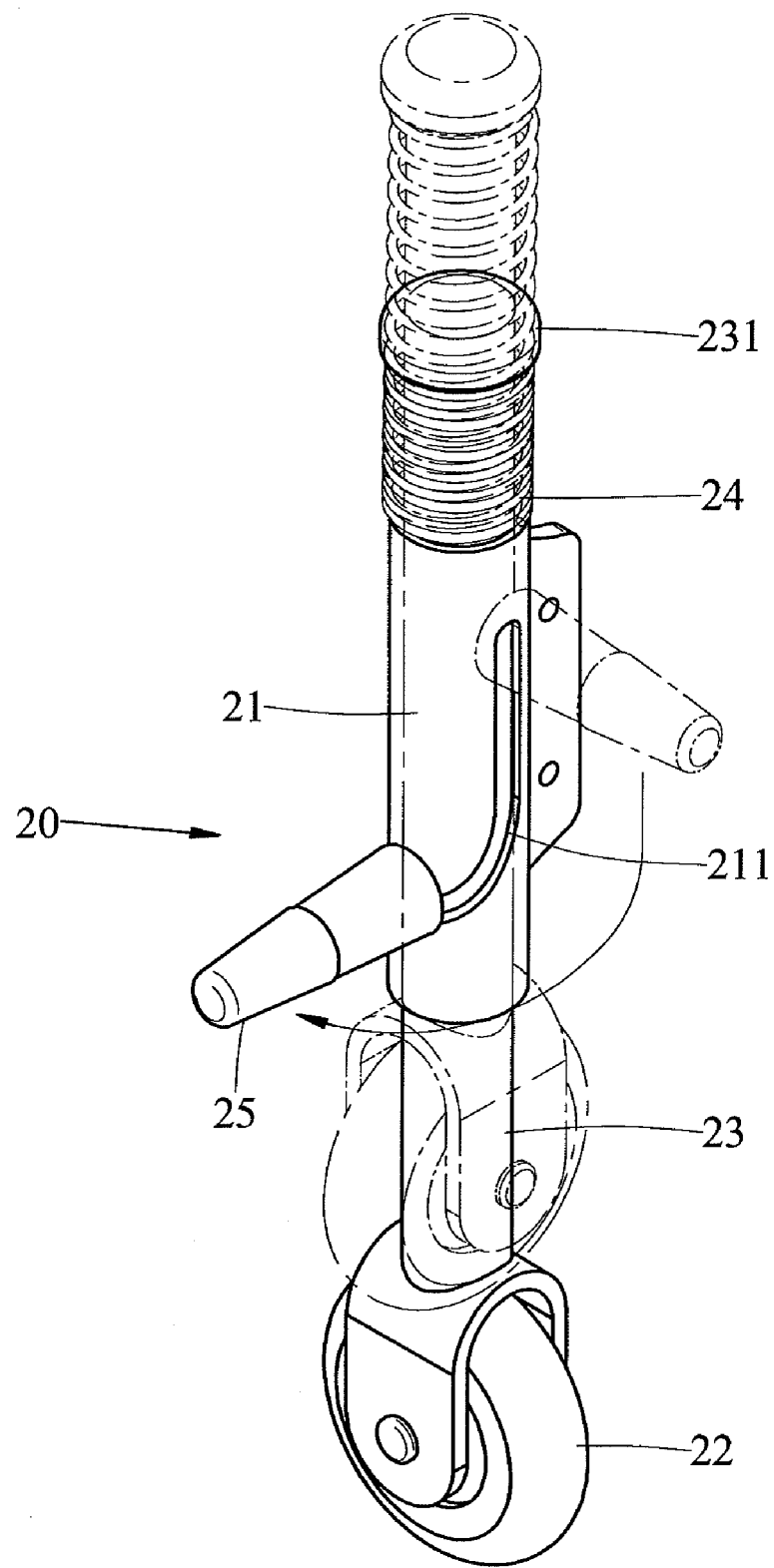
FIG. 4 is a perspective view of the assembled rear assembly for wheeling laterally with its operation shown in phantom.

As shown in FIG. 2, after folding the folding bicycle 10 a rider may further press down the lever 25 with his or her foot until the auxiliary wheel 22 contacts the ground and unfasten the front assembly for wheeling laterally 30, pull down the front assembly for wheeling laterally 30 until the auxiliary wheel 34 contacts the ground, and fasten the front assembly for wheeling laterally 30 again. Each of the auxiliary wheels 22, 34 is directed to a direction perpendicular to that of either wheel 13. The rider then may hold and push the seat 15 to laterally move the folding bicycle 10 to a desired place with ease.

In FIG. 2, it is shown that one side of the folded folding bicycle 10 is supported by the auxiliary wheel 22 of the rear assembly for wheeling laterally 20. This can prevent components of the folded folding bicycle 10 other than wheels 13 from contacting the ground during the lateral wheeling movement of the folding bicycle 10. Otherwise, the components of the folded folding bicycle 10 other than wheels 13 may be damaged due to friction with the ground.

While the invention herein disclosed has been described by means of specific embodiments, numerous modifications and variations could be made thereto by those skilled in the art without departing from the scope and spirit of the invention set forth in the claims.

What is claimed is:

1. A structure for laterally moving a folded folding bicycle including a top tube, a seat stay, a front wheel, a rear wheel, a crank arm, a seat, and a seat tube, comprising:
   a front assembly for wheeling laterally comprising a first auxiliary wheel, the front assembly for wheeling laterally being slidably secured to a lower portion of the seat tube; and
   a rear assembly for wheeling laterally comprising a sleeve secured to the seat stay, the sleeve comprising a longitudinal substantially J-shaped opening having an upward directed notch at a lower end, a support tube having a stop at the top, a second auxiliary wheel rotatably secured to the bottom of the support tube, an elastic member, and a threaded lever,
   wherein the support tube is inserted through the sleeve and the elastic member to secure to the stop and the lever is driven through an upper end of the opening into the support tube to slidably secure the support tube to the sleeve with the elastic member being biased between the stop and the sleeve; and
   wherein in response to folding the folding bicycle the lever is adapted to push downward to slide along the opening until entering the notch to be locked therein so as to further bias the elastic member, change an orientation of the second auxiliary wheel from being parallel to that of the rear wheel to be perpendicular to that of the rear wheel, and cause the second auxiliary wheel to contact the ground.

2. The structure of claim 1, wherein the elastic member is a compression spring.

3. The structure of claim 1, wherein the stop is formed integrally with the support tube.

4. The structure of claim 1, wherein the stop is a nut.

5. The structure of claim 1, wherein the stop is secured to the support tube by soldering.

6. The structure of claim 1, wherein one side of the folded folding bicycle is supported by the second auxiliary wheel such that the components of the folding bicycle other than the front and rear wheels are prevented from contacting the ground during a lateral wheeling movement of the folded folding bicycle.

* * * * *